(12) United States Patent
Hanes et al.

(10) Patent No.: US 8,891,743 B2
(45) Date of Patent: Nov. 18, 2014

(54) GAIN CONTROL ENHANCEMENT FOR MODULATED COMMUNICATIONS

(75) Inventors: M. David Hanes, Lewisville, NC (US); Gonzalo A. Salgueiro, Holly Springs, NC (US); Herbert M. Wildfeuer, Santa Barbara, CA (US); Brooks Stevens Read, Concord, MA (US)

(73) Assignee: Cisco Technology, Inc., San Jose, CA (US)

( * ) Notice: Subject to any disclaimer, the term of this patent is extended or adjusted under 35 U.S.C. 154(b) by 344 days.

(21) Appl. No.: 13/252,725

(22) Filed: Oct. 4, 2011

(65) Prior Publication Data

US 2013/0083909 A1 Apr. 4, 2013

(51) Int. Cl.
| | |
|---|---|
| *H04M 11/00* | (2006.01) |
| *H04N 1/327* | (2006.01) |
| *H04N 1/00* | (2006.01) |
| *H04M 3/18* | (2006.01) |
| *H04M 11/06* | (2006.01) |

(52) U.S. Cl.
CPC ......... *H04M 11/066* (2013.01); *H04N 1/32765* (2013.01); *H04N 1/0022* (2013.01); *H04N 2201/0067* (2013.01); *H04N 2201/0093* (2013.01); *H04N 2201/0068* (2013.01); *H04M 3/18* (2013.01)
USPC ...................................................... 379/93.05

(58) Field of Classification Search
None
See application file for complete search history.

(56) References Cited

U.S. PATENT DOCUMENTS

| | | | | |
|---|---|---|---|---|
| 5,696,819 | A * | 12/1997 | Suizu et al. | 379/406.08 |
| 6,009,549 | A * | 12/1999 | Bliss et al. | 714/769 |
| 6,188,678 | B1 * | 2/2001 | Prescott | 370/318 |
| 7,894,421 | B2 * | 2/2011 | Kwan | 370/352 |
| 7,933,295 | B2 * | 4/2011 | Thi et al. | 370/493 |
| 8,085,787 | B1 * | 12/2011 | Monteiro | 370/395.52 |
| 2002/0072384 | A1 * | 6/2002 | Chheda | 455/522 |
| 2005/0195967 | A1 * | 9/2005 | Pessoa et al. | 379/283 |
| 2008/0013531 | A1 * | 1/2008 | Elliott et al. | 370/356 |
| 2009/0052642 | A1 * | 2/2009 | Tackin et al. | 379/93.05 |
| 2009/0213845 | A1 * | 8/2009 | Li | 370/352 |
| 2010/0198590 | A1 * | 8/2010 | Tackin et al. | 704/214 |
| 2011/0001875 | A1 * | 1/2011 | Nakayama | 348/448 |

OTHER PUBLICATIONS

Linde,L.P., "AGC Strategy for Adaptive Digital Modems Employing Cyclic Channel Estimation in an HF Frequency Hopping Scenario," MIEE Proceedings—1, vol. 138(3), Jun. 1991.
Parsons, G. Real-time Facsimile (T.38)—image/t38 MIME Sub-type Registration, RFC3362, Aug. 2002.
International Telecommunication Union, Implementors' Guide for ITU-T T.38 (Procedures for real-time Group 3 facsimile communication over IP network), Series T: Terminals for Telematic Services Facsimile—Group 3 protocols, Mar. 25, 2011.
SIP Forum, "SIP Forum—Fax Over IP Task Group—Problem Statement," www.sipforum.org, Accessed Jul. 27, 2011.

* cited by examiner

*Primary Examiner* — Maria El-Zoobi
(74) *Attorney, Agent, or Firm* — Brinks Gilson & Lione

(57) ABSTRACT

In one implementation, a method for implementing gain control enhancement for modulated communications includes establishing a communication session between a first endpoint and a second endpoint. The communication session involves forwarding a call signal using an initial gain level until a state transition is detected in the communication session at a digital signal processor. The detection may occur in a transmitting gateway associated with the first endpoint or a receiving gateway associated with the second endpoint. The state transition indicates modulated communications, which may include fax, modem, or text telephony. For example, communication session may be fax over IP (FoIP). The call signal is forwarded using an adjusted gain level based on the state transition. The adjusted gain level may be selected to avoid clipping in the call signal.

20 Claims, 4 Drawing Sheets

GAIN CONTROL ENHANCEMENT FOR MODULATED COMMUNICATIONS

FIELD

The present embodiments relate to a digital signal processing gain control enhancement for modulated communications including modem, facsimile, and text telephony.

BACKGROUND

Facsimile communications date back to well before the introduction of internet protocol (IP) technologies. Likewise, text telephony or teletype and modem communications were well established before IP technologies. In spite of recent trends of adapting modulated communication for transmission over IP networks, the underlying technologies remain analog, and challenges remain for modulated communications over IP networks. Accordingly, vendors, enterprises, and service providers have slowed the use of IP as a real-time fax transport.

Many of the challenges for modulated communication over IP networks stem from the differences between voice communications and modulated communications. For example, the optimal gain setting for modulated communications may be different than that of voice communications. A signal level may be clipped because of an improper gain setting. Voice communications, on the other hand, may not be noticeably degraded by the clipping because a clipped voice signal retains most of the voice spectrum and may simply sound louder. However, a modulated signal clipped at the same level may be degraded such that the modulated communications can no longer be decoded, resulting in a failure in the modulated communications.

DETAILED DESCRIPTION

Overview

Figure 1A:
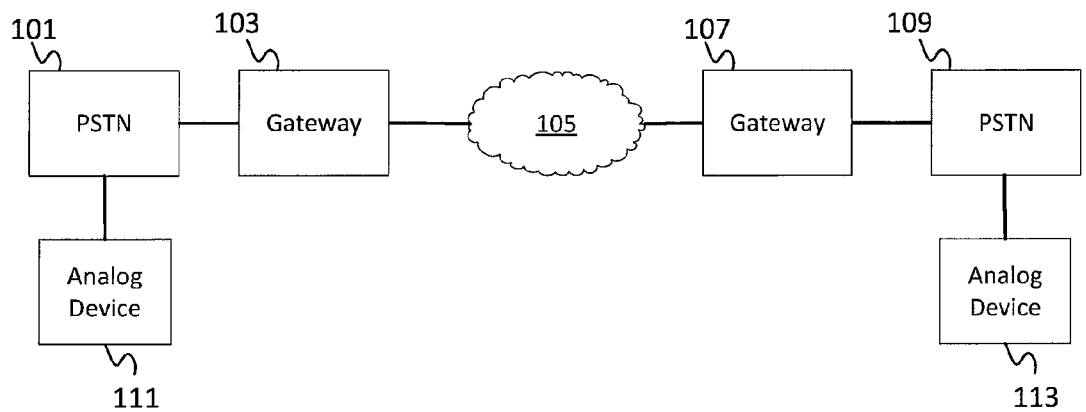
FIG. 1A illustrates a first embodiment of a communication system.

In one aspect, a method includes establishing a communication session between a first endpoint and a second endpoint, forwarding a call signal for the communication session using an initial gain level, detecting a state transition in the communication session at a digital signal processor, wherein the state transition indicates modulated communications, and forwarding the call signal using an adjusted gain level based on the state transition.

In a second aspect, a network device includes a memory and a digital signal processor. The memory stores an initial gain level. The digital signal processor applies the initial gain level to a call signal for a communication session until a state change in the communication session is detected. After the state change in the communication in the communication session is detected, the digital signal processor and applies an adjusted gain level to the call signal for the communication session. The state change indicates modulated communications.

In a third aspect, a non-transitory computer readable medium is encoded with software comprising computer executable instructions. The software, when executed, is operable to establish a communication session between a first endpoint and a second endpoint, forward a call signal for the communication session using an initial gain level set by an automatic gain control, detect a state transition in the communication session, wherein the state transition indicates modulated communications, disable the automatic gain control based on the state transition, and forward the call signal using an adjusted gain level based on the state transition.

EXAMPLE EMBODIMENTS

The International Telecommunication Union (ITU) published specifications and standards for faxing (e.g., T.30) in 1980 before the growth in popularity of the Internet. The first two generations of fax machines (Group 1 and Group 2) have become obsolete. The current generation of fax machines (Group 3) utilizes digital compression methods but remain under the T.30 umbrella and the requirements of the public switched telephone network (PSTN). Voice over IP (VOIP) became a viable alternative to the PSTN but relied on compression algorithms and other optimizations that were designed for voice rather than data. Group 3 fax machines transmission using VOIP suffered from delays, packet loss, and other problems.

The T.38 faxing standard provides for faxes to be transmitted over IP networks. As it has become known, Fax over IP (FOIP) or IP faxing involves a gateway connected to a fax machine either directly or by way of the PSTN. The gateway converts the fax protocol into a data stream that can be transmitted in packets over a network, using for example, a transport protocol such as transmission control protocol (TCP) or user datagram protocol (UDP).

The gateway handles both modulated communications and voice communications. Modulated communications, which include fax, modem, and text telephony, may begin as analog signals for the voice communications in the PSTN. Voice communications may be optimized using an automatic gain control (AGC) or a user may manually adjust the fixed gain on the gateway in order to improve the quality of the voice communications. In either situation, the increase in gain may be to the detriment of modulated communications. For example, the gain may cause the received call signal to be clipped. A clipped signal occurs when an amplifier attempts to generate a signal with more power than the amplifier can support. The amplifier amplifies the signal only up to the maximum output capacity of the amplifier and can amplify no further. For example, consider an input sine wave with an amplitude of A where the gain of the amplifier amplifies an input of 0.5 A to the maximum output of the amplifier. The output can go no higher, and the output of the amplifier at all values from 0.5 A to A are also at the maximum output of the amplifier. For modulated communication signals, clipping may cause significant data loss. However, for voice communications, clipping causes fewer problems. In fact, a louder signal often sounds better to the user, even if the signal includes some clipping.

The transition to modulated communication, switchover in signal type, or exchange of tones between gateways may be referred to as a change in "call status." The following embodiments provide gain control enhancement for modulated communications including modem, facsimile, and text telephony based on the call status.

FIG. 1A illustrates a first embodiment of a communication system. The communication system includes a first analog device 111, the public switched telephone network (PSTN) 101, a first gateway 103, an IP network 105, a second gateway 107, PSTN 109, and a second analog device 113. PSTN 101 and PSTN 109 may be the same network, however, in the embodiments below, communication between PSTN 101 and PSTN 109 occurs through the IP Network 105. Each of the first analog device 111 and the second analog device 113 may be a modem, a fax machine, a teletypewriter (TTY), teleprinter, a text telephony device, or any device configured to transmit or receive modulated communications. The first analog device 111 and the second analog device 113 may be the same type or different types of devices. In other words, the first analog device 111 and the second analog device 113 are endpoints in a communication session. The first analog device 111, which initiated the call or communication session, may be referred to as a first endpoint or the calling party, and the second analog device, which received the call or communication session, may be referred to as the second endpoint or the called party.

The first analog device 111 communicates with the PSTN 101 with a transmitted analog signal. The first gateway 103 includes a digital signal processor that performs various algorithms on the transmitted analog signal and converts the analog signal into digital signals that may be transmitted in packets, such as IP packets. The IP packets are transmitted along the IP network 109 to the second gateway 107, which generates a received analog signal. The received analog signal is a call signal transmitted by the second gateway 107 using an initial gain level. Either the first gateway 103 or the second gateway 107 detects a state transition in the communication session indicative of modulated communication. The receiving gateway forwards the call signal using an adjusted gain level based on the state transition. The second analog device 113 receives the call signal by way of PSTN 109. Depending on the direction of communication, the first gateway 103, which initiates service for the calling party, may be referred to as the emitting gateway, and the second gateway 107, which receives a connection request from the emitting gateway may be referred to as the receiving gateway, or vice versa.

The adjusted gain level is based on the state transition is set in the receiving gateway. Depending on the direction of communication, either the first gateway 103 or the second gateway 107 may be the receiving gateway. The initial gain level is disabled and replaced by the adjusted gain level. The adjusted gain level may be fixed at a predetermined level throughout the modulated communications. The predetermined level may be chosen based on the type of modulated communications detected. Alternatively, the predetermined level may be selected as a function of the amount of clipping detected in the call signal. The predetermined level may be set to unity or 1. Alternatively, in one example embodiment, the predetermined level may be any level from 0.80 to 1.2. In still other examples, the predetermined level may be any other range of values of gain that may be selectively applied to the modulated communications signal.

In some situations, the modulated communication may be primarily in one direction. If there is two-way modulated communication between the first analog device 111 and the second analog device 113, each gateway may detect the state transition and forward the incoming call with a gain based on the call transition as determined at either the receiving gateway or the transmitting gateway. Alternatively, the second gateway 107 (receiving gateway) may generate a control signal including data indicative of the state transition in the communication session and forwarding the control signal to the first gateway 103 (transmitting gateway). The control signal may be any data that describes the state of the call. For example, the control signal may be a control packet, a flag, or a multi-bit value in a data packet for the modulated communication.

Figure 1B:
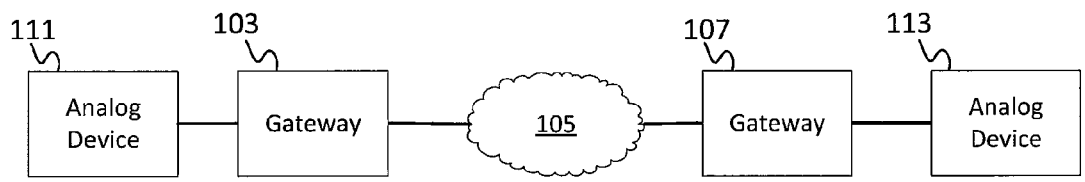
FIG. 1B illustrates a second embodiment of a communication system.
Figure 1C:
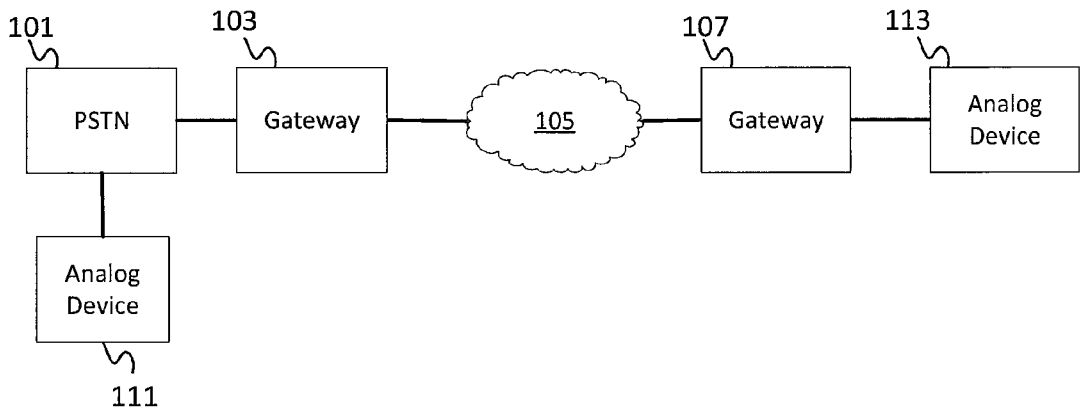
FIG. 1C illustrates a third embodiment of a communication system.

Other arrangements are possible. FIG. 1B illustrates a second embodiment of a communication system in which the first analog device 111 and the second analog device 113 are directly connected to the first gateway 103 and the second gateway 107, respectively. FIG. 1C illustrates a third embodiment of a communication system in which the first analog device 111 is connected to the first gateway 103 through the PSTN 101 and the second gateway 107 is connected directly to the second gateway 107.

Figure 2:
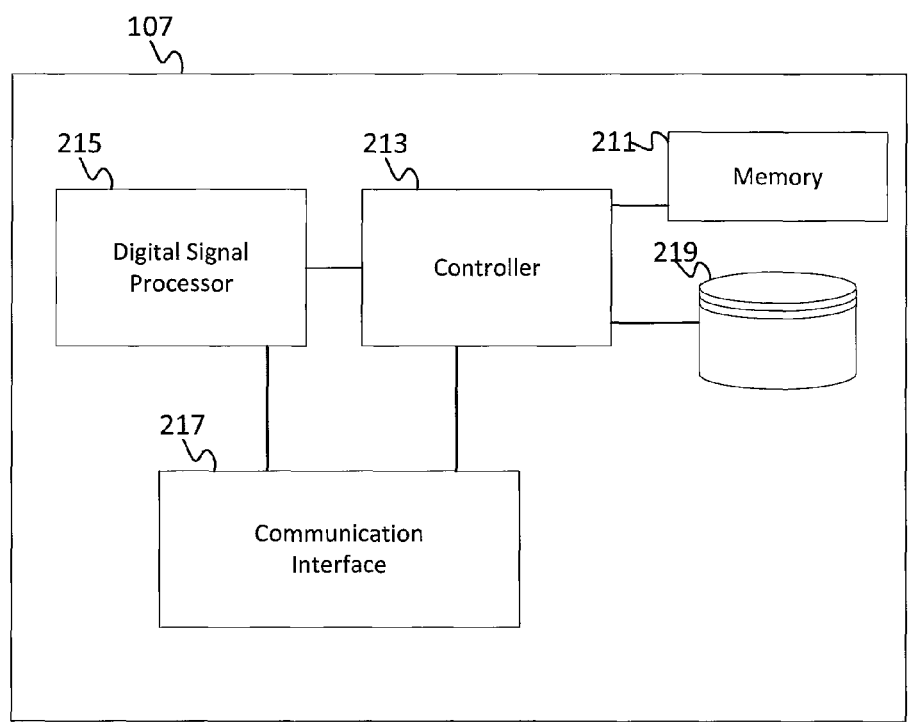
FIG. 2 illustrates an example of a gateway of the communication systems of FIGS. 1A, 1B, and 1C.

FIG. 2 illustrates an example of the gateway 103 and 107 of the communication systems of FIGS. 1A, 1B, and 1C. The gateway 107 includes a memory 211, a controller 213, a digital signal processor 215, a communication interface 217, and a database 219. The controller 213 and the digital signal processor 215 may be implemented as separate hardware components or the digital signal processor 215 may be implemented by the controller 213. Additional or fewer components may be provided that implement the functionality of the gateway 103 and 107 as described herein.

In one example embodiment, the memory 211 stores an initial gain value and a threshold clipping value. The controller 213 establishes a communication session between the first analog device 111 and the second analog device 113. The digital signal processor 215 applies the initial gain level to a call signal for the communication session until a state change in the communication session is detected and applies an adjusted gain level to the call signal for the communication session after the state change in the communication in the communication session is detected.

The state change indicates the change from voice communication to modulated communications. In one embodiment, the digital signal processor 215 may detect the state change of the communication session based on a tone or a flag. In another embodiment, the digital signal processor 215 may detect the state change of the communication session based on host port interface (HPI) messages.

When the digital signal processor 215 detects the state of the communication session based on a tone or a flag, several examples are possible. In a first example, the digital signal processor 215 uses modem relay or fax relay operation. In relay operation the digital signal processor 215 switches between codecs based on the state of the communication session. For example, the digital signal processor 215 strips off the audio carrier of the modulated communications and packages the modulated data using a fax relay format (e.g., T.38). On the other side of the IP network, the data is remodulated and placed back on an audio carrier.

The memory 211 stores a plurality of codecs including at least a voice codec and a modulated communication codec. Example voice codecs include but are not limited to G.711, G.723, G.726, and G.729 as defined by the ITU. A modulated communication codec is a computer program capable of decoded and encoding a digital data stream or signal of fax, modem, or text telephony (e.g., fax/modem codec, modem relay codec).

In an example embodiment, the digital signal processor 215 applies an initial gain level to a call signal for the communication session using an initial gain level when the voice codec is accessed from the memory 211, which may be indicated by a flag set by the digital signal processor 215. The initial gain level may be set by automatic gain control. When the digital signal processor 215 receives a tone indicative of modulated communication, the digital signal processor 215 selects the modulated communications codec and the call state changes to modulated communication as indicated by changing the flag. The digital signal processor 215 applies an adjusted gain level to the call signal for the modulated communications. The adjusted gain level may be a unity gain.

Alternatively or in addition, the adjusted gain level may be dynamically determined by the gateway based on, for example, the post-gain levels of the call signal. For example, the digital signal processor 215 detects if level of the call signal exceeds the threshold clipping level stored in the memory 211, where signals above the threshold level causes clipping or near-clipping. The communication interface 217 forwards the call signal using the adjusted gain level based on the state transition.

In a second example, the digital signal processor 215 uses duplex modem passthrough operation. In passthrough, the digital signal processor 215 does not switch codecs. Instead, the digital signal processor 215 uses the voice codec for modulated communications. That is, the digital signal processor 215 digitizes and sends fax, modem, or text telephony tones using the voice codec (e.g., G.711). On the other side of the IP network, the data is decoded and transmitted to the receiving device using the configured codec.

In an example embodiment using duplex passthrough operation, the state transition of the call may be derived from an echo cancellation algorithm. The echo cancellation algorithm may utilize the call transition information for echo suppression. For example, the digital signal processor 215 may detect a duplex modem handshake answer tone to trigger deactivation of echo suppression. The duplex modem handshake may begin with a tone at 2100 Hz or 2225 Hz. If the answer tone includes phase reversals at intervals of approximately 450 mS, then echo cancellers are disabled. The disabled state of the echo cancellers may be stored in memory 211 as a flag that indicates the state transition of the call. Accordingly, the digital signal processor 215 may apply the initial gain level to the call signal for the communication session until a state change in the communication session is detected by querying a flag associated with echo suppression, and apply an adjusted gain level to the call signal for the communication session after the state change in the communication in the communication session is detected.

In an example embodiment using half-duplex passthrough operation, additional indicators may be used by the digital signal processor 215 to detect the change in call state. For example, G3 fax control messages (e.g., V.21) may include preamble flag characters. The flag characters may have a duration of approximately 1 second. The digital signal processor 215 may detect the call transition and initiate the adjusted gain level based on the flag characters. After a predetermined time period of silence, the digital signal processor 215 may return to the initial gain level. Additionally, in G3 image modulation (e.g., V.27ter, V.29, and V.17), G3 image modulation bursts are preceded by a V.21 control message. Therefore, if the gain control algorithm remains active until a silence interval greater than the interval between the V.21 control message and an image modulation gap (specified as 75+−20 mS in T.30), the image modulation will automatically be subject to the gain control.

In another example embodiment, when the digital signal processor 215 detects the state change of the communication session based on HPI messages, the digital signal processor 215 relies on the operating system of the gateway 107 to indicate when the transition of the call is taking place. For example, the digital signal processor 215 may monitor HPI messages to determine when the digital signal processor 215 is programmed to handle modulated communications. Examples of three HPI messages that may be monitored are hpi_fax_mode, hpi_modemrelay_mode, and hpi_voice_mode. In other examples, greater or fewer HPI messages may be monitored. If, for example, a voice call is in progress and then an hpi_voice_mode message with Coding Type parameter set 1 (G.711 ulaw) or 2 (G.711 alaw) and the voice activity detection (VAD) flag parameter is set to 0 (disabled), then a switchover to fax/modem passthrough has been detected and the initial gain is set to an adjusted gain.

An overview of the logic and HPI messages used for this embodiment follows:

```
IF during a voice call,
  hpi_fax_mode gets set to cisco or T.38
  OR
  hpi_modemrelay_mode gets set
  OR
  hpi_voice_mode gets set to G.711 and VAD disabled
THEN set gain for fax/modem.
```

In each of the above example embodiments, the digital signal processor 215 is also configured to determine that the modulated communications are no longer present. The detection of the absence of modulated communication may be the opposite of the detection of modulated communication. For example, the detection may be silence detection, a timeout, a change in a flag, a change in echo suppression, or a HPI message. Accordingly, the digital signal processor 215 restores the communication session to the initial gain level based on the end of modulated communications. For example, AGC may be enabled at the end of modulated communications when the digital signal processor 215 returns to voice communications.

The memory 211 may be any known type of volatile memory or a non-volatile memory. The memory 211 may include one or more of a read only memory (ROM), dynamic random access memory (DRAM), a static random access memory (SRAM), a programmable random access memory (PROM), a flash memory, an electronic erasable program read only memory (EEPROM), static random access memory (RAM), or other type of memory. The memory 211 may include an optical, magnetic (hard drive) or any other form of data storage device. The memory 211 may be located in a remote device or removable, such as a secure digital (SD) memory card.

The memory 211 may store computer executable instructions for filtering and routing communication session requests. The digital signal processor 215 may be a program executed by the controller 213 or separate hardware component. The controller 213 may execute computer executable instructions. The computer executable instructions may be included in computer code. The computer code may be written in any computer language, such as C, C++, C#, Java, Pascal, Visual Basic, Perl, HyperText Markup Language (HTML), JavaScript, assembly language, extensible markup language (XML) and any combination thereof.

The computer code may be stored in one or more tangible media or one or more non-transitory computer readable media for execution by the controller 213 or controller 713. A computer readable medium may include, but is not limited to, a floppy disk, a hard disk, an application specific integrated circuit (ASIC), a compact disk CD, other optical medium, a random access memory (RAM), a read only memory (ROM), a memory chip or card, a memory stick, and other media from which a computer, a processor or other electronic device can read.

The controller 213 and/or the digital signal processor 215 may include a general processor, digital signal processor, application specific integrated circuit, field programmable gate array, analog circuit, digital circuit, server processor, combinations thereof, or other now known or later developed processor. The controller 213 and/or the digital signal processor 215 may be a single device or combinations of devices, such as associated with a network or distributed processing. Any of various processing strategies may be used, such as multi-processing, multi-tasking, parallel processing, remote processing, centralized processing or the like. The controller 213 and/or the digital signal processor 215 may be responsive to or operable to execute instructions stored as part of software, hardware, integrated circuits, firmware, micro-code or the like.

The communication interface 217 may include any operable connection. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other or through one or more intermediate entities (e.g., processor, operating system, logic, software). Logical and/or physical communication channels may be used to create an operable connection. As used herein, the phrases "in communication" and "coupled" are defined to mean directly connected to or indirectly connected through one or more intermediate components. Such intermediate components may include both hardware and software based components.

Figure 3:
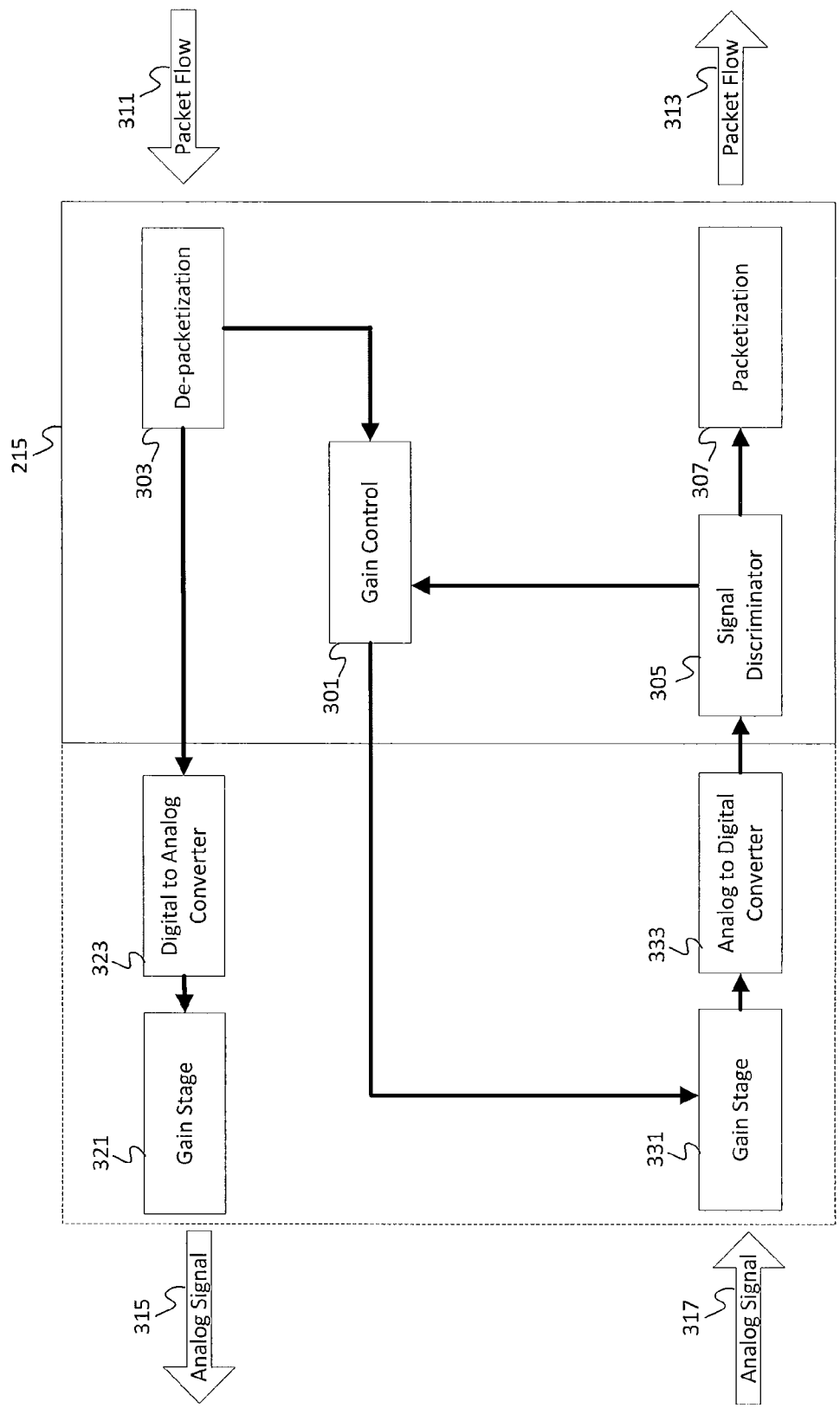
FIG. 3 illustrates an example of digital signal processor of the gateway of FIG. 2.

FIG. 3 illustrates an example of digital signal processor 215 of the gateway 107 or the gateway 103. The digital signal processor 215 includes a gain control module 301, a de-packetization module 303, a signal discriminator 305, and a packetization module 307. As shown by the dotted lines, other elements, including a first gain stage 321, a digital to analog converter 323, a second gain stage 331, and an analog to digital converter 333 may be included in the digital signal processor 215. Alternatively, these other elements may be implemented elsewhere in the gateway. The outgoing path of the digital signal processor 215 includes an input analog flow 317 and an output packet flow 313. Conversely, the incoming path of the digital signal processor 215 includes an input packet flow 311 and an output analog signal 315.

The gateway includes two feedback loops for adjusting the gain of the call signal, which may be included individually or in combination. A first feedback loop involves only one channel. For example, the gain control module 301 detects a state transition in the communication session. The state transition indicates the beginning or ending of modulated communications. The gain control module 301 sends a command to the gain stage 301 to adjust the gain of the analog signal 317.

The analog signal is digitized by the analog to digital converter 333 and sent to the signal discriminator 305. The signal discriminator 305 detects clipping in the communication session or detects a tone/flag in the call signal. The tone/flag may be detected using any of the examples discussed above. The signal discriminator 305 may detect clipping directly by analysis of digitized samples, e.g. peek sample value counts, or measured average signal energy exceeding a threshold. The signal discriminator 305 may also detect too weak of a signal by determining if a measured average signal energy drops below a threshold. The packetization module 313 packages the data of the call signal into IP packets suitable for transmission on the IP network 105.

A second feedback loop involves both the incoming channel and the outgoing channel. The digital signal processor 215 receives incoming IP packets as packet flow 311 from the IP network 105. As the digital signal processor 215 removes the packet headers and other data from the IP packets at the de-packetization module 303, the digital signal processor 215 may also read a flag, time length value field, or a multibit value from the IP packet. The flag, time length value field, or a multibit value may indicate a gain control signal received from the first gateway 103. The first gateway may have generated the gain control signal based on the algorithm discussed above as the first feedback loop.

The digital data from the unpacked IP packets are converted back to an analog signal 317 by the digital to analog converter 323. If appropriate in the incoming channel, the gain of the analog signal 317 is adjusted by the gain stage 321. While not shown, the gain stage 321 may be in communication with the gain control module 301. The control signal to adjust the gain in the gain stage 321 may be derived from the first feedback loop of the gateway 107, the second feedback loop of the gateway 107, the first feedback loop of the gateway 103, or the second feedback loop of the gateway 107.

Figure 4:
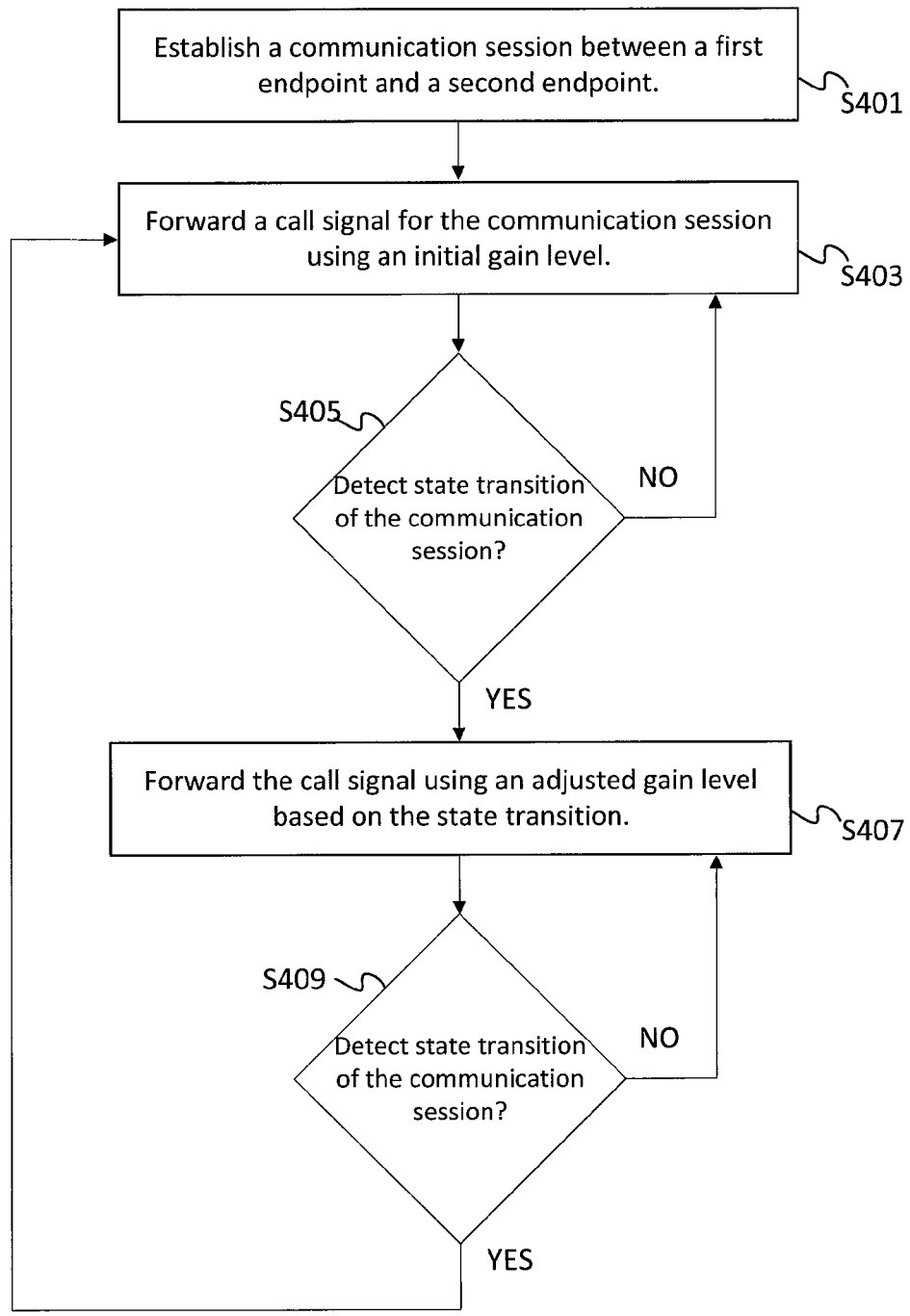
FIG. 4 illustrates an example flow chart for gain control enhancement for modulated communications.

FIG. 4 illustrates an example flow chart for gain control enhancement for modulated communications. Gain control enhancement may be performed at the first gateway 103, the second gateway 107, or both. In addition, the gain control at either gateway may be based on feedback provided internally, feedback provided by the other gateway, or both. The gain control enhancement is performed by a digital signal processor, which may be implemented as software under the command of controller 213 of the second gateway 107 or a controller of the first gateway 103, or as dedicated hardware.

At act S401, the digital signal processor 215 establishes a communication session between a first endpoint and a second endpoint. The terms "first" and "second" serve to only distinguish between endpoints and do not suggest an order or a direction of communication. The first endpoint and the second endpoint may be any type of fax, modem, or text telephony devices. The digital signal processor 215 selects an initial gain level. The initial gain level may be determined by an automatic gain control algorithm or set by the user at a fixed value. In some example embodiments, users may "tune" the fixed value by listening for the best sounding level using voice communications. At act S401, the communication interface 217 forwards a call signal for the communication session using the initial gain level.

At act S405, the digital signal processor 215 detects a state transition in the communication session, such that the state transition indicates modulated communications. The state transition may be detecting in either the first gateway 103 or the second gateway 107. The detection of the state transition may involve querying the signal discriminator 305 to determine whether the post gain signal or data includes clipping. Alternatively, the detection of the state transition may include receiving a control signal from another digital signal processor. When the second endpoint comprises the digital signal processor, the first endpoint comprises the another digital signal processor.

Data indicative of the state transition may include an answer tone or modem handshake identified by a tone at a predetermined frequency. Data indicative of the state transition may include a preamble flag character in a control message. The preamble flag character may be detected by a flag character detector compliant with V.21. Data indicative of the state transition may include an HPI message. The HPI message may indicate a mode of the digital signal processor 215 as set by the operating system of the gateway 107.

When the state transition indicates that the communication session has switched over to modulated communications, the algorithm proceeds to act S407, and the communication interface 217 forwards the call signal using an adjusted gain level based on the state transition. The digital signal processor 215 may also disable the automatic gain control.

If the state transition does not indicate that the communication session has switched over to modulated communications, the algorithm continues to wait for a state transition at act S405. Likewise, after act S407, the algorithm waits for additional state transitions at act 5409. A state transition at act S409 indicates that the communication session has returned to voice communications and accordingly, the algorithm returns to act S403.

Various embodiments described herein can be used alone or in combination with one another. The foregoing detailed description has described only a few of the many possible implementations of the present embodiments. For this reason, this detailed description is intended by way of illustration, and not by way of limitation.

We claim:

1. A method comprising:
   establishing, by a gateway, a communication session between a first endpoint and a second endpoint, the communication session including an analog voice signal;
   forwarding the analog voice signal of the communication session using an initial gain level;
   converting, by a digital signal processor embedded in the gateway, the analog voice signal to a digital voice signal;
   detecting a clipping level in the digital voice signal at the digital signal processor;
   detecting a state transition in the communication session at the digital signal processor, wherein the state transition indicates the analog voice signal has been identified as an analog fax signal;
   selectively adjusting, by the digital signal processor, the initial gain level due to detection of the state transition, according to the detected clipping level of the digital voice signal;
   converting, by the digital signal processor, the analog fax signal to a digital fax signal subsequent to the selective adjustment of the initial gain level; and
   forwarding the digital fax signal using the selectively adjusted gain level.

2. The method of claim 1, further comprising: generating a control signal including data indicative of the state transition in the communication session; and forwarding the control signal to the first endpoint.

3. The method of claim 1, wherein the adjusted gain level is fixed at a predetermined level.

4. The method of claim 1, further comprising: disabling the initial gain level, wherein the initial gain level is set by an automatic gain control.

5. The method of claim 1, further comprising: setting, at the digital signal processor, the adjusted gain level to unity.

6. The method of claim 1, wherein detecting the state transition in the communication session comprises detecting an answer tone.

7. The method of claim 1, wherein detecting the state transition in the communication session comprises detecting a preamble flag character.

8. The method of claim 1, wherein detecting the state transition in the communication session comprises detecting host port interface messages.

9. The method of claim 1, further comprising: detecting an end to the analog fax signal in the communication session; restoring the communication session to the initial gain level based on the end of the analog fax signal.

10. A non-transitory computer readable medium that includes computer executable instructions comprising:
    instructions to establish a communication session between a first endpoint and a second endpoint, the communication session including an analog voice signal;
    instructions to forward the analog voice signal of the communication session using an initial gain level set by an automatic gain control;
    instructions to determine whether the analog voice signal is an analog fax signal;
    instructions to detect a state transition in the communication session, wherein the state transition indicates that the analog voice signal is an analog fax signal;
    instructions to selectively adjust the initial gain level due to the detection of the state transition in the communication session;
    instructions to apply the selectively adjusted gain level to the analog fax signal;
    instructions to disable the automatic gain control due to the detection of the state transition in the communication session;
    instructions to convert the analog fax signal to a digital fax signal subsequent to selective adjustment of the gain level to the analog fax signal and the disablement of the automatic gain control; and
    instructions to forward the digital fax signal using the selectively adjusted gain level, wherein the selectively adjusted gain level avoids clipping in the call digital fax signal.

11. The non-transitory computer readable medium of claim 10, further comprising:
    instructions to receive a control signal internal to the first endpoint that indicates the state transition as derived from the call analog voice signal on an outgoing channel.

12. The non-transitory computer readable medium of claim 10, further comprising:
    instructions to receive a control signal from the second endpoint that indicates the state transition as derived from the analog voice signal received on an incoming channel.

13. A method comprising:
    establishing, by a gateway, a communication session between a first endpoint and a second endpoint, the communication session including an analog voice signal;
    applying an initial gain level to the analog voice signal until a state change in the communication session is detected;
    detecting the state change in the communication session at a digital signal processor, wherein the state change indicates the analog voice signal has been identified as an analog fax signal;
    applying, by the digital signal processor, a selectively adjusted gain level to the analog fax signal, due to the detection of the state change in the communication session;
    converting, by the digital signal processor, the analog fax signal to a digital fax signal subsequent to the applying of the selectively adjusted gain level to the analog fax signal;

detecting, by the digital signal processor, a post-analog-to-digital-conversion gain level in the digital fax signal;

adjusting, by the digital signal processor, the post-analog-to-digital-conversion gain level, when the post-analog-to-digital-conversion gain level exceeds a maximum clipping threshold;

adjusting, by the digital signal processor, the post-analog-to-digital-conversion gain level, when the post-analog-to-digital-conversion gain level drops below a minimum energy threshold;

adjusting, by the digital signal processor, the post-analog-to-digital-conversion gain level according to an incoming packet gain level of an incoming communication using a fax over Internet Protocol (FoIP); and packetizing, by the digital signal processor, the digital fax signal for outgoing transmission using the FoIP.

14. The method of claim 13, further comprising detecting the state change based on a transition between use of a modulated communication codec and a voice codec to decode the analog voice signal.

15. The method of claim 13, further comprising detecting the state change from an answer tone in the analog voice signal.

16. The method of claim 13, further comprising detecting the state change from a flag stored in memory.

17. The method of claim 13, further comprising detecting the state change from a preamble flag character, a host port interface message, or both.

18. The method of claim 13, further comprising forwarding the call analog voice signal using the adjusted gain level based on the state change.

19. The method of claim 18, wherein the adjusted gain level is fixed at a predetermined level.

20. The method of claim 18, further comprising:

generating a control signal including data indicative of the state change in the communication session; and forwarding the control signal to another gateway participating in the communication session.

* * * * *